United States Patent

Allen et al.

[15] 3,689,703

[45] Sept. 5, 1972

[54] INFORMATION RECORDING SYSTEM

[72] Inventors: Larry Carl Allen, Arvada; Roderic Romero, Boulder, both of Colo.

[73] Assignee: Bell Telephone Laboratories Incorporated, Murray Hill, N.J.

[22] Filed: Dec. 21, 1970

[21] Appl. No.: 100,169

[52] U.S. Cl. ....................179/18 B
[51] Int. Cl. ....................H04m 3/42
[58] Field of Search ....................179/18 BA

*Primary Examiner*—William C. Cooper
*Attorney*—R. J. Guenther and James Warren Falk

[57] ABSTRACT

A control information recording system arranged so that a predetermined telephone station user may write changes into memory storage locations assigned for use by other telephone stations. The system is arranged so that the predetermined station's class of service indication in combination with a dialed code enables a register to release the predetermined station's automatically recorded line equipment location number and replace it with a selected station line equipment location number dialed by the predetermined telephone station user. The register utilizes this dialed line equipment location number to access a common memory storage location which is defined by the selected station's line equipment location number.

10 Claims, 11 Drawing Figures

INVENTORS
L.C. ALLEN
R. ROMERO
BY Charles W Davis
ATTORNEY

INFORMATION RECORDING SYSTEM

BACKGROUND OF THE INVENTION

1. Field of the Invention

This invention relates generally to switching equipment in an automatic telephone system. In particular, it relates to switching equipment wherein a selected telephone subset is enabled to write information into a centralized memory store location normally assigned for use by another telephone subset.

2. Description of the Prior Art

In the past certain special services have been made available to telephone subscribers to provide them with features which render their telephone service more convenient and more flexible. One example of these services is centralized abbreviated dialing wherein a subscriber is required to dial only a two- or three-digit code in order to be connected to another subscriber whose location would otherwise require the dialing of a full directory number. Another example is an arrangement whereby a subscriber controls special service equipment such that upon the subsequent completion of an incoming call to the subscriber's line the connection is automatically transferred to a remote telephone location determined in advance by the subscriber and at a time determined by the subscriber.

Such services are advantageously provided by common equipment located at a centralized location such as a telephone central office. The particular service is thereupon available to be activated and controlled by the subscriber using the telephone subset at the subscriber's premise. In the normal manner of operation a subscriber is assigned a specific storage location in a centralized memory wherein various control and directing information may be recorded by the subscriber without assistance from anyone else. Each subscriber's storage location in memory is identifiable and locatable by utilizing the line equipment location number assigned to the subscriber's line in the telephone central office.

Each subscriber having subscribed to one of the variety of special services utilizing a centralized memory may establish and maintain entries in his assigned memory storage location. To accomplish a change, or addition, the special service subscriber lifts the handset of his telephone subset and dials a special change code. The telephone central office recognizes this action as a change request and locates the memory storage location by utilizing the automatically recorded line equipment location number of the calling subscriber's line. When the calling subscriber's memory storage location has been found, a special tone is returned to the subscriber to indicate that he may proceed to make the desired entries.

In many cases it is desirable that one telephone subset should be enabled to make entries into a memory location assigned to another telephone subset. For example it may be desired that a secretary use the secretary telephone subset to enter a list of directory numbers into the centralized memory location assigned for abbreviated dialing use by an executive telephone subset. In a likewise manner a physician who is leaving his office may dial his home directory number from his office telephone subset into a centralized memory location assigned to his office telephone subset to have incoming office calls transferred to his home. Later, the physician may desire to use his home telephone subset to dial another directory number into the memory location assigned to his office telephone subset in order than any incoming office calls may be transferred from his office to the other directory number.

A prior art special service telephone system for repertory dialing such as disclosed by W. A. Malthaner and H. E. Vaughan in U.S. Pat. No. 2,951,908, issued Sept. 6, 1960, is arranged to identify a centralized memory location by means of an automatically recorded line equipment location number unique to the calling subscriber's line. Although the Malthaner patent is a substantial contribution to the technology it does not permit a subscriber subset attached to a line uniquely identified by a first line equipment location number to make entries into a memory store location identified by a second line equipment location number of another subscriber's line.

Accordingly, a need exists in the art for an arrangement which will allow a subscriber located at a selected telephone subset to make entries into a centralized memory store location assigned to another telephone subset.

SUMMARY OF THE INVENTION

In accordance with one illustrative embodiment of our invention a centralized memory is utilized to provide special services, such as abbreviated dialing, to lines connected to a telephone switching system. Each line is assigned a memory storage location addressable by an automatically recorded line equipment location number identifying an enabled line desiring to gain access to its assigned memory storage location. A designated line can access the memory storage location of another line by dialing a predetermined code followed by the line equipment location number of the other line from a telephone subset connected to the designated line. The circuitry is arranged to delete the automatically recorded line equipment location number of the enabled designated line and to substitute the dialed line equipment location number therefore. Thus, the telephone subset connected to the designated line may be coupled to the centralized memory in order to write entries into the memory storage location assigned to the line designated by the dialed line equipment location number.

DESCRIPTION OF THE DRAWING

The foregoing advantages of the present invention, as well as others, will be apparent from the subsequent description of the exemplary embodiment shown in the drawing, in which.

Figure 1:
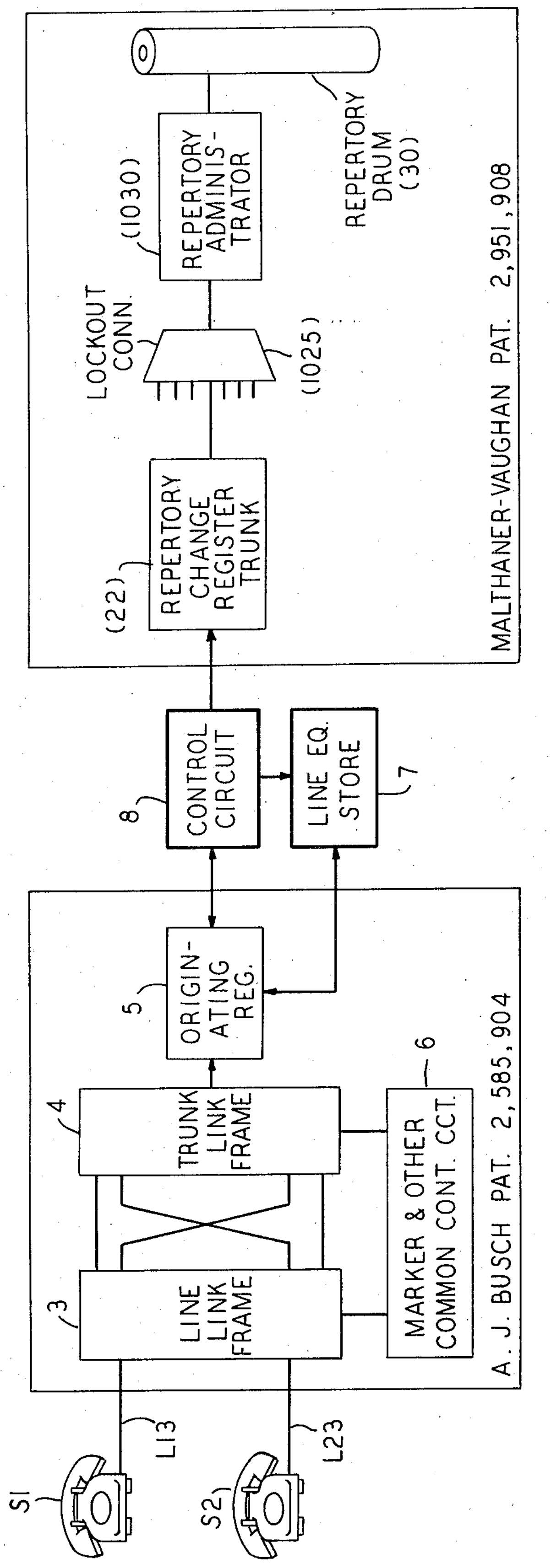
FIG. 1 is a block diagram showing the interrelation of the component elements of the exemplary embodiment.

It will be noted that FIGS. 2 through 9 employ a type of notation referred to as "Detached Contact" in which an "X," shown intersecting a conductor, represents a normally open "make" contact of a relay, and a "bar," shown intersecting a conductor at right angles, represents a normally closed "break" contact of a relay; "normally" referring to the unoperated condition of the relay. The principles of this type of notation are described in an article entitled "An Improved Detached-Contact-Type of Schematic Circuit Drawing" by F. T. Meyer, in the September, 1955, publication of *American Institute of Electrical Engineers Transactions, Communications and Electronics*, Volume 74, pages 505–513.

For the purpose of illustration, as discussed in detail hereinafter, the various figures of the drawing employ apparatus disclosed in previously issued patents. In order to facilitate a clear understanding of the instant invention, such apparatus designations have been retained and are enclosed in parentheses to facilitate cross reference with the patent from which they were derived.

The present invention is illustrated in this embodiment in conjunction with the information verification circuit disclosed by S. Kandel et al. in U.S. Pat. No. 3,206,554, issued Sept. 14, 1965. In the embodiment the common control automatic telephone system is similar to the common control system set forth in A. J. Busch in U.S. Pat. No. 2,585,904, issued Feb. 19, 1952, and modified by the addition of a common repertory memory and associated equipment of the type set forth in the aforementioned W. A. Malthaner et al. patent. It is to be understood, however, that the present invention is not limited to use with a telephone system so arranged but may be utilized with other types of switching systems.

To facilitate an understanding of the relationship between the presently disclosed embodiment and the disclosures of the above-noted prior patents, there is given below in Table I a cross reference between elements of the instant disclosure and of the cited patents. Specifically, in this table the apparatus components cited in this disclosure are listed and indexed according to the corresponding figures in the cited patents. In the subsequent detailed description, reference may be made back to this table as an aid in understanding the presently disclosed embodiments of our invention:

TABLE I

A. J. BUSCH PATENT 2,585,904

| Apparatus Component | FIG. No. |
|---|---|
| Relay AO<br>Relay A1<br>Relay A2<br>Relay A4<br>Relay A7 | 184 |
| Relay BO<br>Relay B1<br>Relay B2<br>Relay B4<br>Relay B7 | 184 |
| Relay CO<br>Relay C1<br>Relay C2<br>Relay C4<br>Relay C7 | 184 |
| Relay CTO | 55 |
| Relay CUO<br>Relay CU7 | 71 |
| Relay F | 220 |
| Relay F1 | 39 |
| Relay FTO<br>Relay FT1<br>Relay FT2<br>Relay FT3 | 71 |
| Relay FUO<br>Relay FU1<br>Relay FU2<br>Relay FU4<br>Relay FU7 | 55 |
| Relay HGO<br>Relay HG1<br>Relay HG2<br>Relay HG4<br>Relay HG7 | 55 |
| Relay ON<br>Relay ON1 | 220 |
| Relay VFO<br>Relay VF1<br>Relay VF2<br>Relay VF3<br>Relay VF4 | 71 |
| Relay VGO<br>Relay VG1<br>Relay VG2<br>Relay VG4<br>Relay VG7<br>Relay VG10 | 71 |

W. A. MALTHANER ET AL. PATENT 2,951,908

| Apparatus Component | FIG. No. |
|---|---|
| A relay 981<br>S relay 982<br>B relay 983<br>Grated amplifier 985<br>Dial tone generator 986<br>Transformer 987<br>Monopulser 988<br>Resistance RB | 35 |
| AND gate 1018<br>Toggles 1019<br>Toggle 984 | 34<br>38 |

S. KANDEL ET AL. PATENT 3,206,554

| Apparatus Component | FIG. No. |
|---|---|
| Interdigital timer 47 | 3 |
| Relay CAO<br>Relay CA1<br>Relay CA2<br>Relay CA4<br>Relay CA7 | 2 |
| Relay CBO<br>Relay CB1<br>Relay CB2<br>Relay CB4<br>Relay CB7 | 3 |
| Relay CS | 2 |
| Relay ONC | 2 |
| Relay RS | 7 |
| Relay T | 3 |
| Tone Source 60 | 6 |
| Relay W | 3 |

It is to be noted that an H digit register has been added to the originating register set forth in the Busch patent for the purpose of recording an extra dialed digit. It is to be further noted that the Malthaner et al disclosure utilizes solid state and vacuum tube circuit components such as conventional double stability twin-triode vacuum tube stages hereinafter referred to as toggles, to perform the various circuit functions. In order to simplify disclosure of the present invention, the Malthaner et al. circuit components are utilized to control relay devices in the embodiment as will be more apparent hereinafter. Accordingly, techniques well known in the art, such as the insertion of flip-flops serially in various leads between the Malthaner et al. solid state components and the relay components, are utilized in this illustrative embodiment to provide the necessary relay activating power. Examples of this technique are shown in B. W. Lee U.S. Pat. No. 2,991,449, issued July 4, 1961.

The invention described herein is particularly concerned with apparatus in line equipment store 7 and control circuit 8 shown in FIG. 1. Line equipment store 7 and control circuit 8 are represented by the blocks shown with heavy lines in order to distinguish them from the prior art equipment units, which are neither shown nor described in detail except where necessary for a complete understanding of the invention.

For the purpose of illustration, it is intended that the apparatus of line link frame 3, trunk link frame 4, originating register 5, and common control circuit 6 correspond to apparatus disclosed in the Busch patent and that repertory change register trunk (22), lockout connector (1025), repertory administrator (1030), and repertory drum (30) correspond to apparatus disclosed in the Malthaner et al. patent. For a more complete understanding of the construction and operation of these components, the appropriate patent, as set forth above, may be consulted.

GENERAL DESCRIPTION

The interrelation and function of equipment units of the exemplary embodiment will now be described with reference to FIG. 1 wherein the interconnection between circuit blocks have been designated by means of arrows to show the direction of circuit action. Telephone station subset S1, which is provided with an abbreviated dialing special service feature is shown connected by line L13 to line link frame 3. Another telephone station subset S2, which is permitted to make directory entries into a memory storage location assigned to telephone subset S1 in a manner hereinafter described in detail, is shown as connected by line L23 to line link frame 3. Originating register 5 is shown connected to trunk link 4. As is fully disclosed in the Busch patent, telephone subsets connected to lines terminated on line link frames and originating registers terminated on trunk link frames are interconnected when active by means of crossbar switches on these frames and by inter-frame junctors. All such interconnections are effected, under control of a common group of circuits including marker and other common control circuits 6.

Control circuit 8 and line equipment store 7 are shown interconnected between originating register 5 of the Busch system and repertory change register trunk (22) of the Malthaner et al. system. As set forth in detail in the Malthaner et al. system, repertory change register trunk (22), lockout connector (1025), and repertory administrator (1030) are utilized to perform the write function on an abbreviated dialing call, hereinafter referred to as an AD call, and to thereby store an AD code and associated directory number in repertory drum (30).

A subscriber located at telephone subset S1 is enabled to write an entry into repertory drum (30) by removing the receiver from the switchhook and upon receipt of dial tone dialing a write function alerting code. As set forth in detail in the Busch system the line equipment location number of the line associated with telephone subset S1 is automatically recorded in originating register 5. The Kandel et al. system describes in detail the method of recording the write function alerting code in control circuit 8 and the procedure wherein telephone subset S1 is connected to repertory change register trunk (22). The Kandel et al. patent also describes the procedure wherein the recorded line equipment location number of line L13 is transferred to repertory change register trunk (22). When this connection has been established a special dial tone is returned to the calling subscriber to indicate that the desired entry, comprising the AD code and directory number, may be dialed from telephone subset S1. As disclosed by the Malthaner et al. system, circuits associated with repertory drum (30) compare the line equipment location number of the calling line with the line equipment location numbers recorded on repertory drum (30). When a match is found the desired directory number is written into a memory location associated with the dialed two digit AD code and the recorded line equipment location number.

In accordance with one feature of our invention a subscriber located at designated telephone subset S2 is enabled to write entries into the memory location assigned to telephone subset S1 by first removing the receiver of telephone subset S2 and then dialing a write function alerting code followed by the line equipment location number of line L13 associated with telephone subset S1. The line equipment location number of calling line L23 is automatically recorded by line equipment store 7 in originating register 5 along with the dialed write function alerting code and line equipment location number of line L13. As described hereinafter in detail the dialed code in combination with the dialed line equipment location number enables control circuit 8 and line equipment store 7 to replace the automatically recorded line equipment location number of line L23 by the dialed line equipment location number of line L13. The substitution of the line equipment location number of line L13 enables telephone subset S2 to be connected to repertory change register trunk (22) and permits a subscriber located at subset S2 to write entries into the memory location of repertory drum (30) assigned for use by telephone subset S1.

Reference will now be made to FIGS. 1 through 9 in order to described in detail the invention as portrayed in the illustrative embodiment.

DETAILED DESCRIPTION

As explained in the aforementioned general description a subscriber located at telephone subset S2, FIG. 1, is enabled to perform a write function in the memory location of repertory drum (30) assigned for use by telephone subset S1 just as though a subscriber located at telephone subset S1 had initiated a conventional write function. In order to clearly understand this novel manner of executing the write function from telephone subset S2 a conventional write function call from telephone subset S1 will be described first.

In order to complete calls from a telephone subset, such as subset S1, connected by line L13 to an automatic telephone switching system of the type disclosed in the Busch patent, it is necessary to completely identify the line connected to the calling telephone subset. Each subscriber's line terminates on a conventional line link frame identified by a frame tens (FT–) digit and a frames unit (FU–) digit. The basic components of a line link frame comprise crossbar switches subdivided into vertical groups (VG-) of 50 subscriber lines. A vertical group is further subdivided into 10 horizontal groups (HG–) of five vertical file (VF–) switches each utilized for terminating a subscriber line. Thus, as set forth in detail in the Busch patent, each subscriber line is uniquely identified by a line equipment location number made up of frames ten (FT–), frames units (FU–), vertical group (VG–), horizontal group (HG–) and vertical file (VF–) digits. For the present embodiment it will be assumed that line L13, associated with telephone subset S1, is assigned to line equipment location FT–0, FU–3, VG–11, HG–8, and VF–3. It is further assumed that line L23, associated with telephone subset S2, is assigned to line equipment location FT–0, FU–3, VG–09, HG–6, and VF–1.

Figure 3:
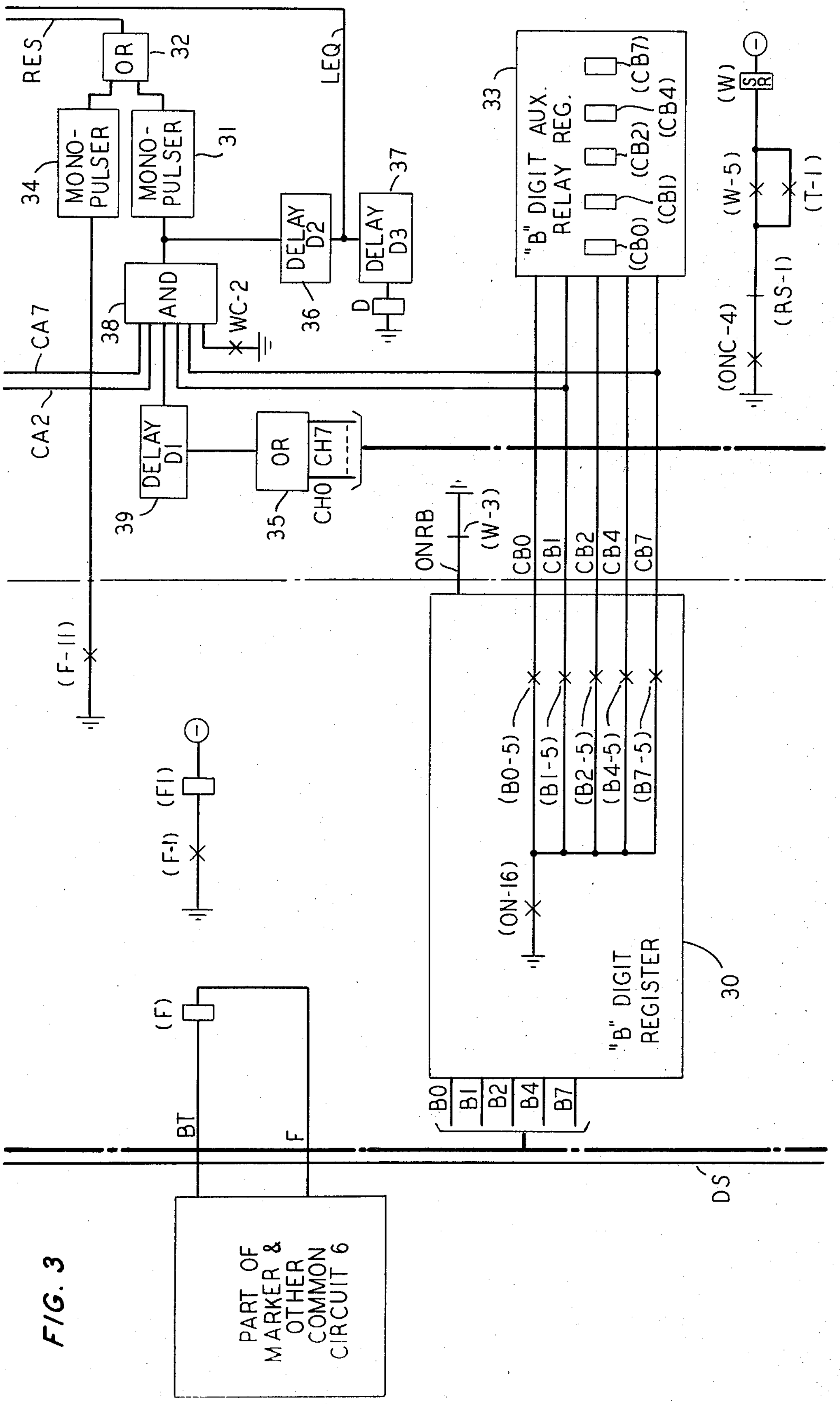

When a subscriber located at telephone subset S1, FIG. 1, lifts the receiver to initiate a write function call, marker and other common control circuits 6 cause the connection of originating register 5 to line L13 as set forth in detail in the Busch disclosure. Referring now to FIG. 3 the seizure of originating register 5 results in the operation of relay (F). Operation of relay (F) results in the input of monopulser 34 being grounded through operated make contact (F-11). Monopulser 34 in response to a grounded input generates a short duration pulse to operate OR gate 32 to enable the RES lead to line equipment store 7.

Figure 5:
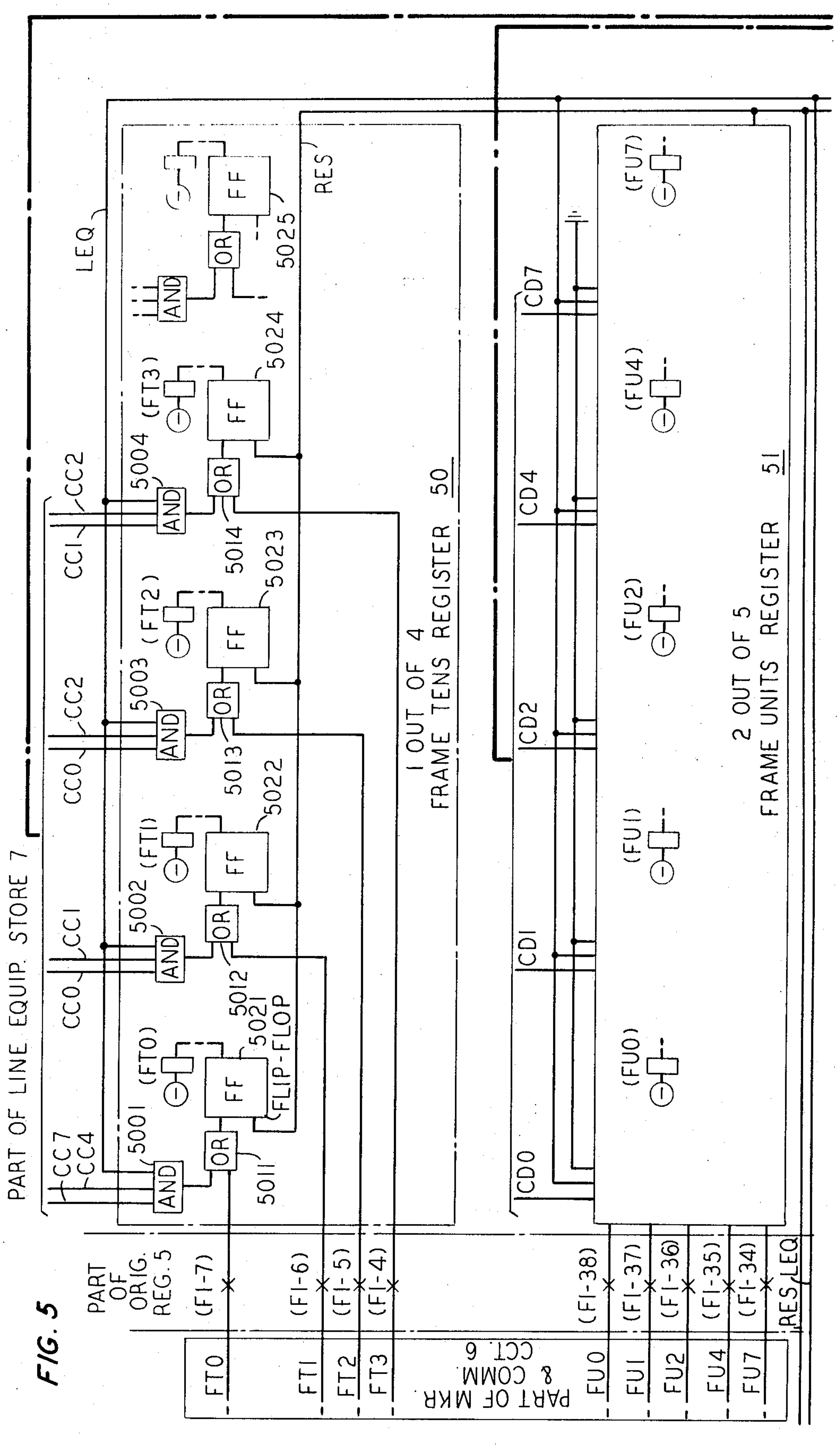
Figure 6:
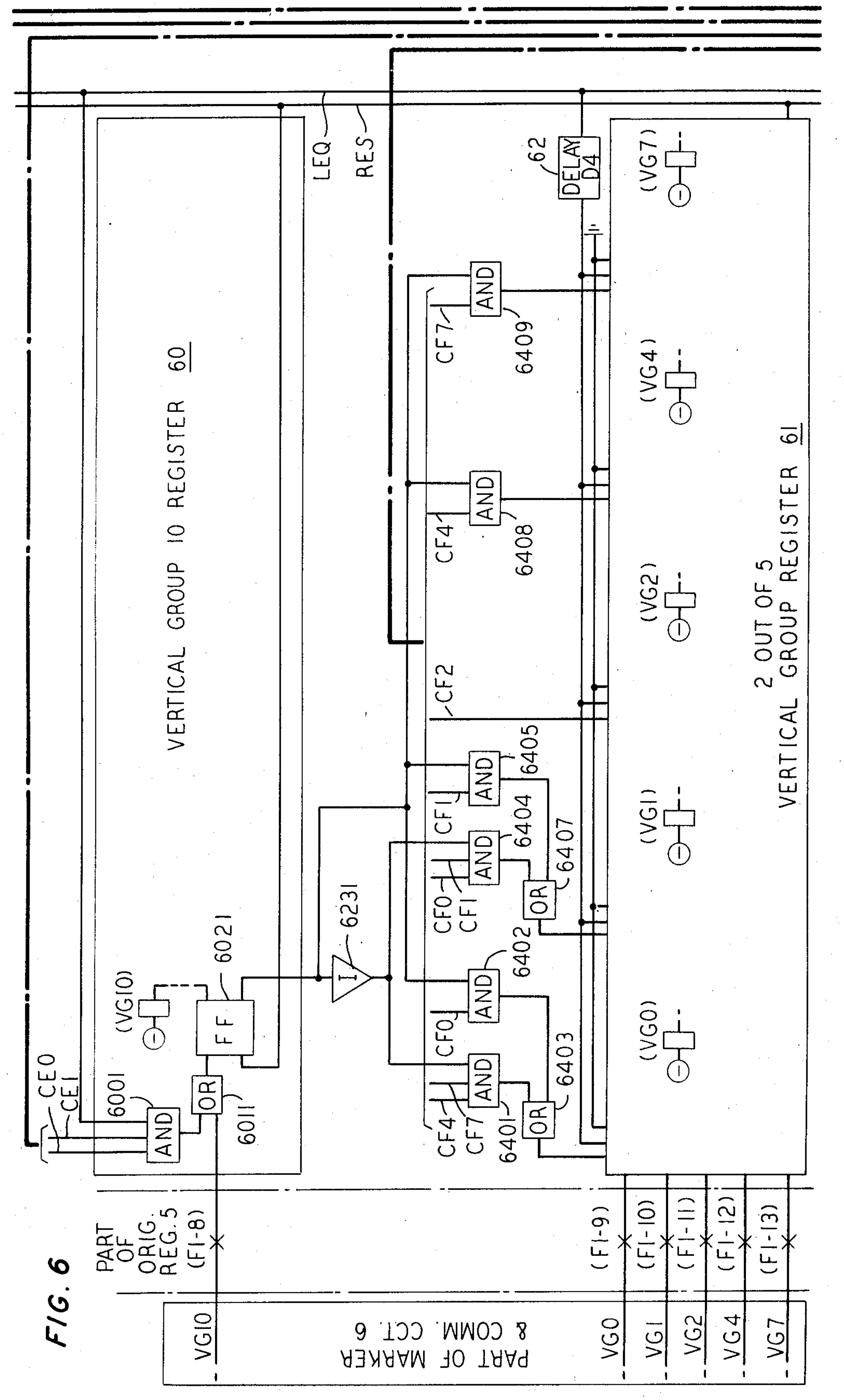
Figure 7:
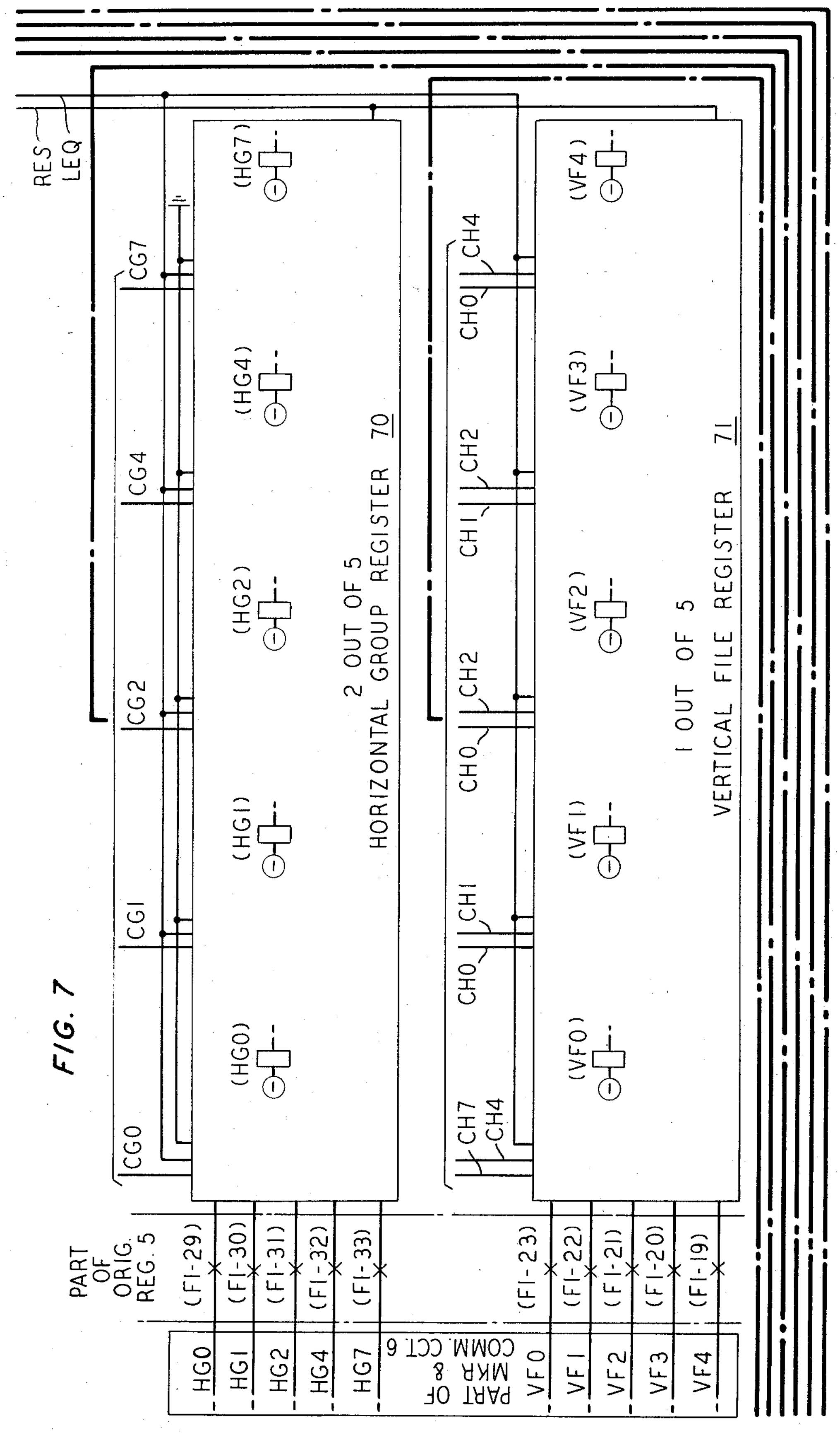

Line equipment store 7, FIGS. 5 through 7, is comprised of frames tens register 50, frame units register 51, vertical group 10 register 60, vertical group register 61, horizontal group register 70, and vertical file register 71. It is assumed for the present embodiment that the component parts of each of the aforementioned registers, with the exception of vertical group 10 register 60, are identical to those shown for frame tens register 50 in FIG. 5. Referring now to frame tens register 50 it is intended that each register include five set-reset storage elements such as flip-flop (FF) 5021 and associated logic gates 5001 and 5011. It is further intended that the relays connected by broken lines to the set-reset storage elements are located in originating register 5 and are operated when the flip-flops are in the set state and are released when the flip-flops are reset. Vertical group 10 register 60, FIG. 6, differs from the other registers only in that one set-reset storage element is provided. Thus, the enabling of the RES lead by OR gate 32 resets the flip-flops of the registers of line equipment store 7 shown in FIGS. 5, 6, and 7 in order that the line equipment location number of the calling line may subsequently be recorded by the relays of registers 50, 51, 60, 61, 70, and 71.

The operation of the (F) relay, FIG. 3, in addition to enabling monopulser 34, prepares an obvious operate path through make contacts (F–1) for relay (F1). The (F1) relay in operating closes leads shown in FIGS. 5, 6, and 7 from marker and other common control circuits 6 through originating register 5 to transfer the line equipment location number of the calling line to line equipment store 7. As described in detail in the Busch patent, marker and other common control circuits 6 places ground on the appropriate lead to indicate the line equipment location number of the calling line. Thus, for calling line L13, leads (FT0), (FU1), (FU2), (VG10), (VG1), (HG7), (HG1), and (VF3) are grounded thereby indicating that line L13 is located at line link frame 03, vertical group 11, horizontal group 8, and vertical file 3. Grounding of lead (FT0), FIG. 5, enables OR gate 5011 of frame tens register 50 to set flip-flop 5021 to operate relay (FT0). In a likewise manner relays (FU1) and (FU2) are operated by frame units register 51 and relays (VG10) and (VG1), FIG. 6, are operated respectively by vertical group 10 register 60 and vertical group register 61. Similarly, the horizontal group indication is registered on relays (HG7) and (HG1), FIG. 7, by horizontal group register 70 and the vertical file indication is recorded by the operation of relay (VF3) by vertical file register 71.

Figure 2:
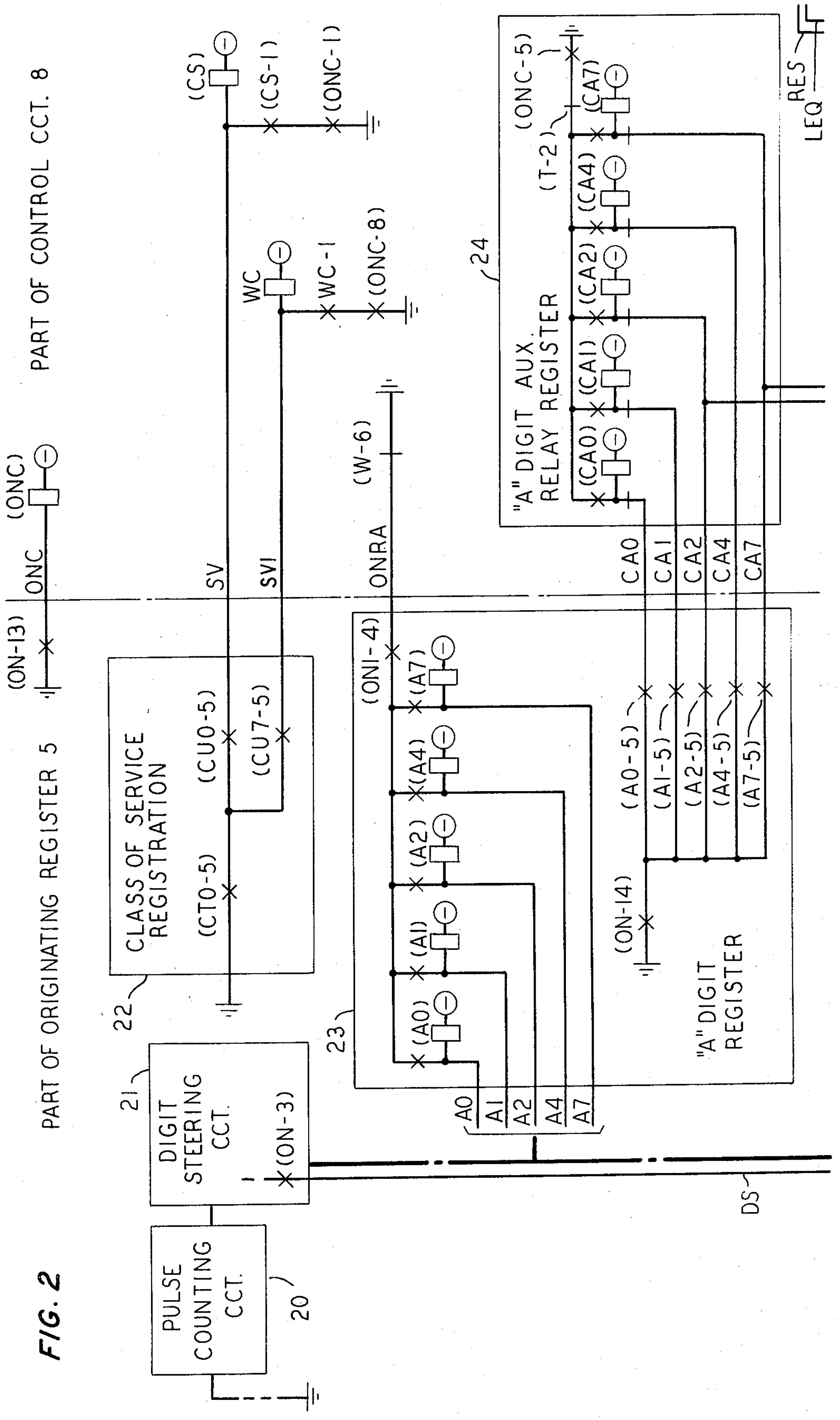
FIGS. 2 through 9 are diagrams in schematic form showing in greater detail the interrelation of the components of the exemplary embodiment.

Referring now to FIG. 2, when originating register 5 is seized, relay (ONC) in control circuit 8 operates from ground provided through operated make contact (ON–13) in originating register 5. As disclosed in detail in the Busch patent relay (ON) remains enabled during the functioning of originating register 5; therefore, relay (ONC) remains operated under control of the originating register (ON) relay.

Each telephone subset, such as subset S1, having access to repertory drum (30) will be assigned to a specific class of service indicating the general type of service feature that is available to a subscriber utilizing the subset. For example, telephone subset S1 may be assigned a class of service number 00 indicating that a subscriber located at telephone subset S1 may employ the AD special service feature. In addition, telephone subset S2 may be assigned class of service number 07 indicating that a subscriber may employ telephone subset S2 to make entries into the memory location assigned to other telephone subsets. Thus, on a write function call originated from telephone subset class cclass of service relays (CTO) and (CUO) are automatically operated in originating register 5 in the manner shown in detail in the Busch disclosure. Make contact 5 on each of these relays, illustrated in the class of service registration circuit 22 of originating register 5, places ground on the SV lead to operate relay (CS) in control circuit 8. Relay (CS) in operating locks operated through make contact (CS–1) and previously operated make contact (ONC–1) to ground.

Change of Station S2 Memory Initiated by Station S1

A subscriber having a special service feature, such as abbreviated dialing, may from time to time desire to add a directory number to his memory storage location on repertory drum (30). To indicate a request to control the write function, the subscriber may for example, be instructed upon receipt of dial tone, to dial a two-digit write function alerting code and await a second dial tone. On receipt of the second dial tone the subscriber dials an AD code followed by the desired directory number.

Upon receipt of a first dial tone, a subscriber located at telephone subset S1 dials the write function alerting code which may, for example, be digits 98. These digits are registered in A and B digit registers 23 and 30, respectively, as set forth in detail in the Busch disclosure in the well-known two-out-of-five basis. Therefore, for code 98, relays (A2), (A7) and (B1), (B7), not shown, will operate in digit register 23 and 30 of FIGS. 2 and 3. The resultant grounding of the (CA2), (CA7), (CB1), and (CB7) leads, in response to the dialed code 98, operate the correspondingly designated relays in A digit auxiliary relay register 24 and B digit auxiliary relay register 33 of control circuit 8.

Figure 4:
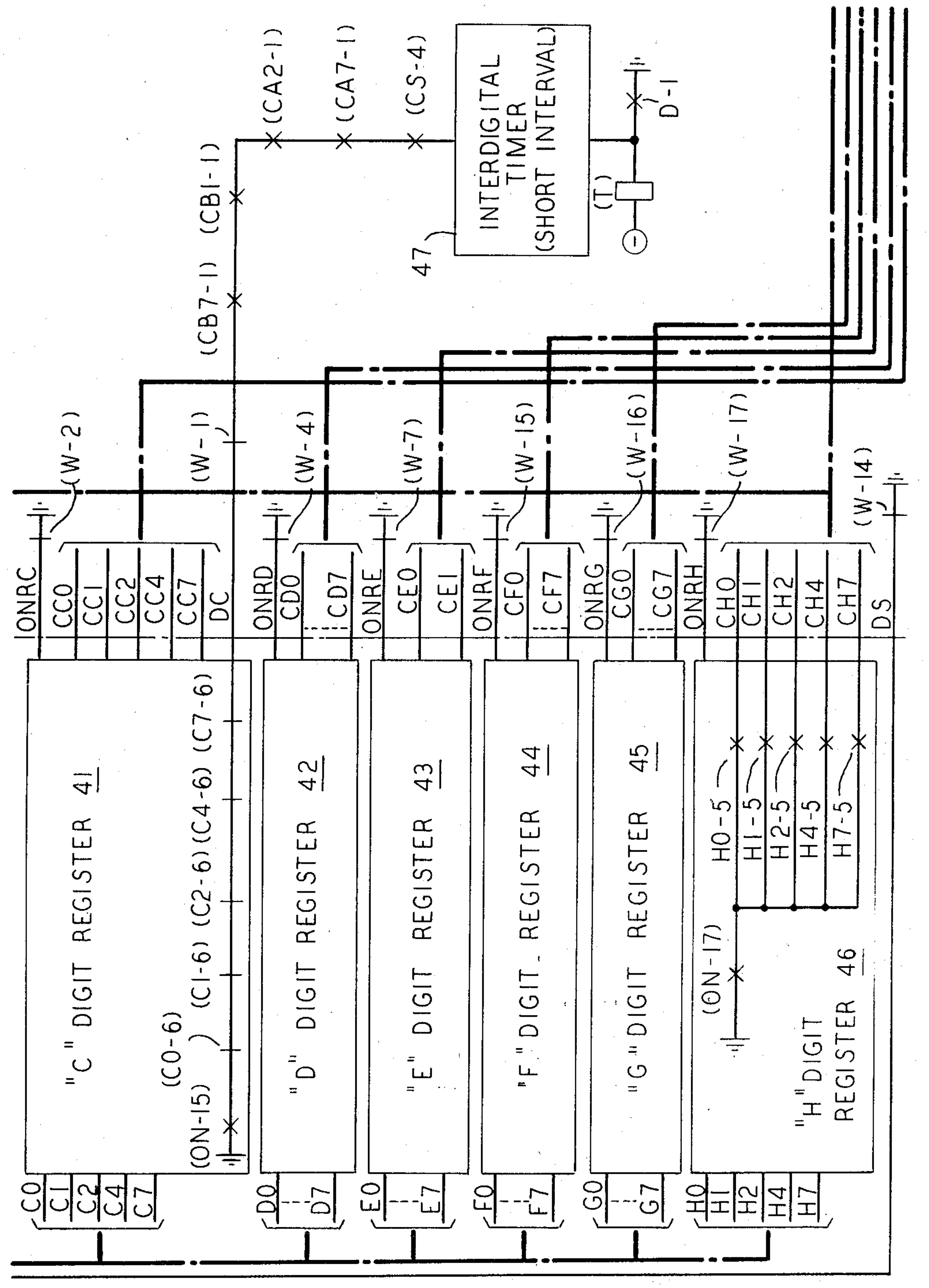

Accordingly, interdigital timer (47), FIG. 4, is enabled by make contacts (CS–4), (CA7–1), (CA2–1), (CB1–1), (CB7–1), break contact (W–1), via lead DC, through a chain of released (CO–C7) relay contacts in C digit register or originating register 5 to ground through operated make contact (ON–15). Since the calling subscriber is dialing a write function alerting code comprising only two digits, no (CO–C7) relays will be enabled at this time and timer (47) will function to operate relay (T) in control circuit 8.

The operated relay (T) completes the obvious operate path of relay W through operated make contact (T–1), released break contact (RS–1), and operated make contact (ONC–4) to ground. The operation of relay (W), which locks operated through make contact (W–5), indicates to control circuit 8 that a subscriber entitled to the AD privilege has dialed an alerting code indicating a request to control the memory equipment write function.

Figure 8:
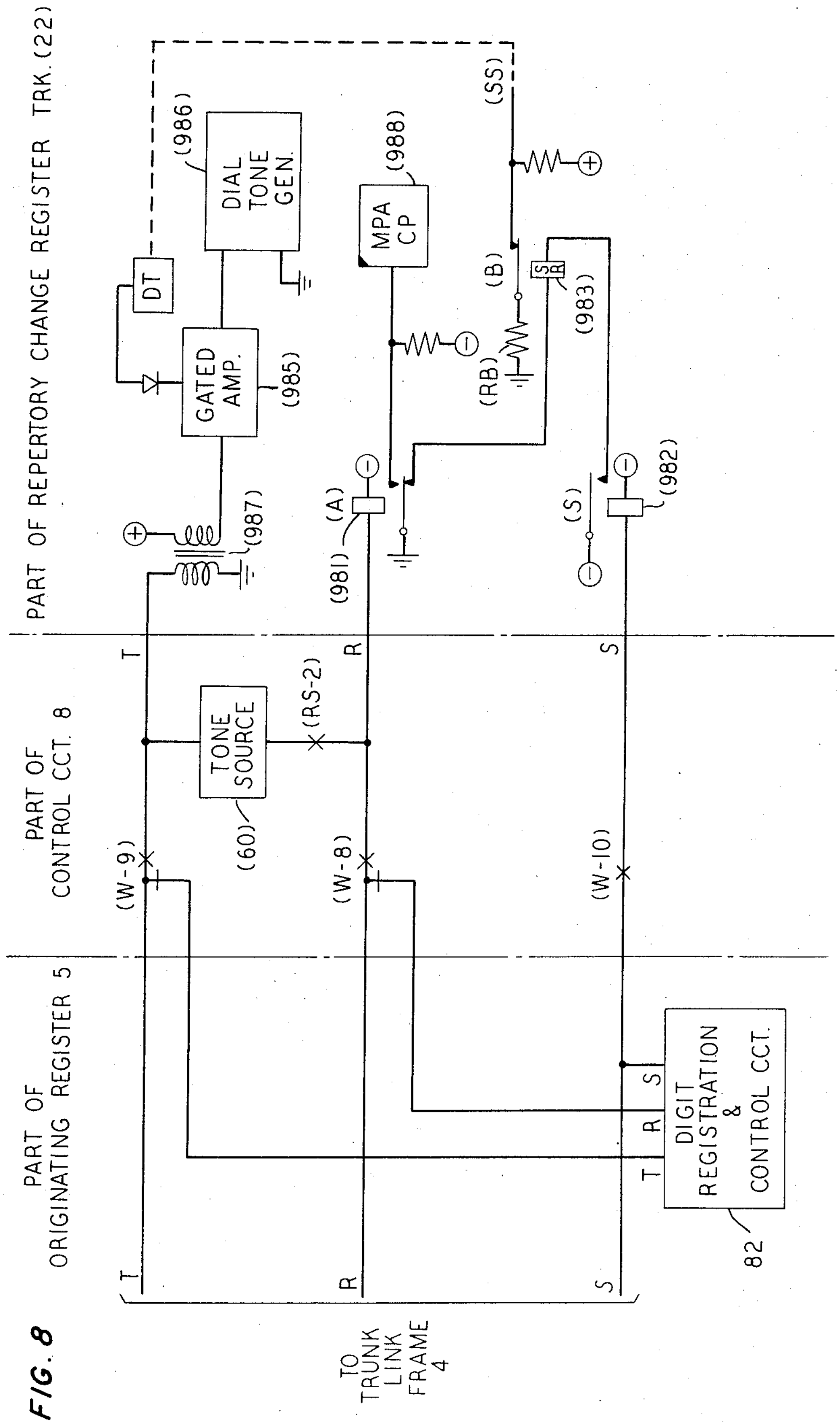

The operated relay (W) opens the holding ground for the relays in the A through H digit registers via operated W-break contacts in leads (ONRA) through (ONRH) in FIGS. 2 through 4 thus releasing the operated A2, A7, B1 and B7 digit registration relays in originating register 5 and preventing operation of the CO–C7 through HO-H7 registration relays at this time. As shown in FIG. 8, the operation of relay (W) also closes through the T, R, and S leads of subscriber's line L13 to repertory change register trunk (22) at operated make contacts (W–8), (W–9), and (W–10).

Repertory change register trunk (22) detects and accumulates the digits dialed by an AD subscriber and dispatches the line equipment location number of the calling subscriber's line, the dialed AD code and the directory number to be associated therewith to administrator repertory (1030), FIG. 1.

When the T and R leads of the subscriber's line are extended via make contacts (W–9) and (W–8), FIG. 8, to repertory change register trunk (22), relay (981) therein will operate over the loop through the calling subscriber's telephone subset S1. With DT toggle normal in repertory change register trunk (22), a negative signal voltage is applied through a diode to gated amplifier (985) as discussed in detail in the Malthaner et al. patent. Dial tone generator (986) thereupon supplies dial tone through gated amplifier (985) to the primary winding of transformer (987), and in this manner a second dial tone is transmitted over line L13 to the calling subscriber at telephone subset S1. The subscriber is thus alerted that he may commence dialing the AD code followed by the associated directory number.

Relay (S) in repertory change register (22) operates from ground present on the S lead of the subscribers line. The operation of relay (S) provides negative battery to one side of the winding of relay (B) which does not operate at this time because of the previous operation of relay (A) as set forth in the Malthaner et al. disclosure.

When the subscriber's line opens in response to the first break of the calling subscriber's dial contacts, relay (981) releases and in releasing operates relay (983). As disclosed in detail in the Malthaner et al. patent, each release of relay (981) generates a negative signal voltage to the input of CP monopulser (988), thereby forwarding this information to the dial pulse accumulator circuit. As further disclosed in the Malthaner et al. patent, the operation of relay (983) causes a positive signal voltage to be applied to the (SS) lead, through circuitry not shown, thereby causing the disabling of gated amplifier (985) and removing dial tone from the subscriber's line.

Relay (981) will release on each line opening produced by the dial contacts and will reoperate on each dial closure. Relay (983) is a slow release relay and will remain operated during each train of dial pulses representing each digit dialed by the subscriber, and will release only in the interdigital interval. As disclosed in detail in the Malthaner et al. patent, the alternate positive and negative signal voltages applied to the (SS) lead control the operation of the successive stages of the steering circuit, so that the digits dialed by the calling subscriber are registered in their respective groups of register toggles.

Figures 9, 10, 11:
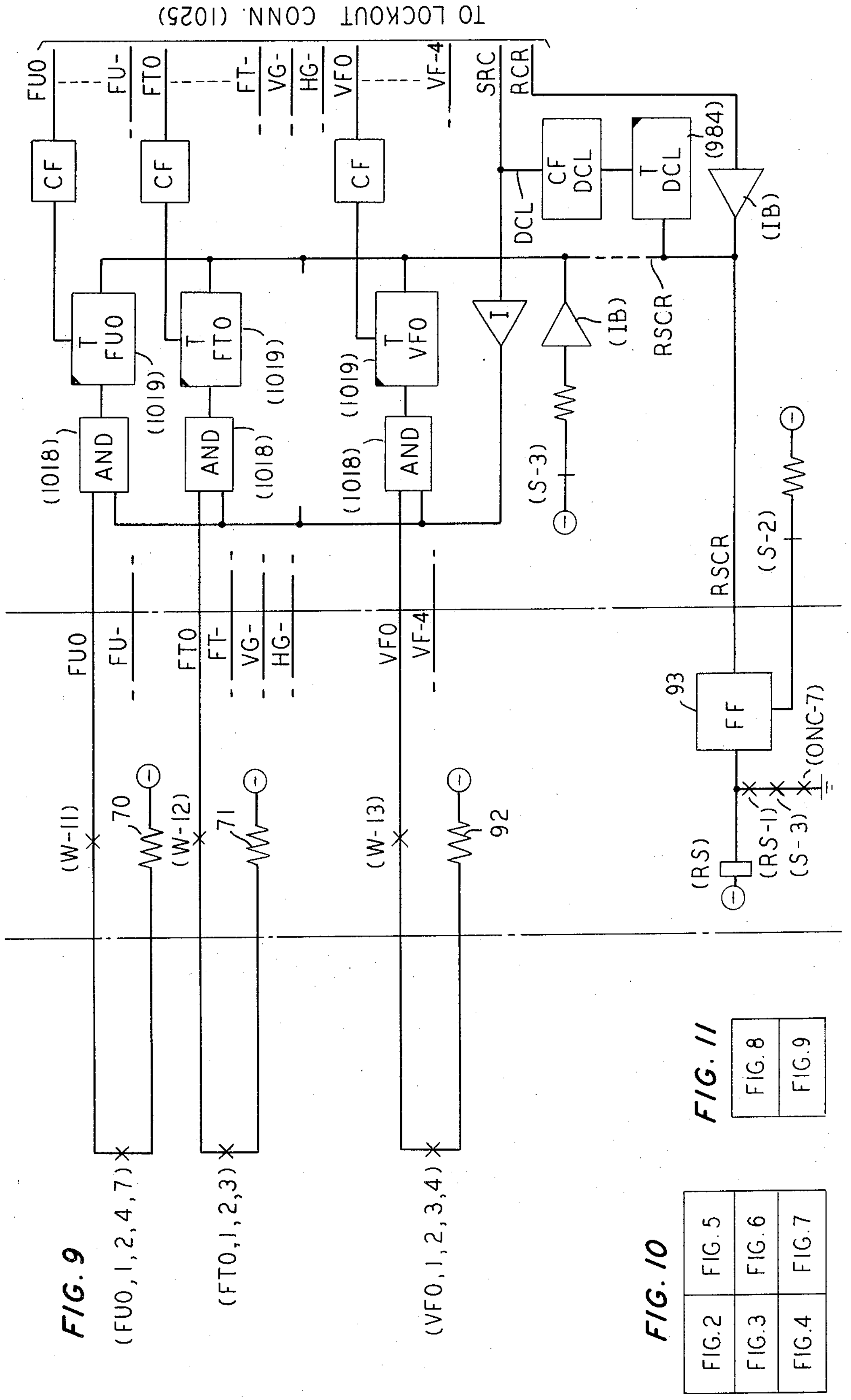
FIGS. 10 and 11 are key charts depicting the position in which the various figures should be placed.

As disclosed in detail in the Malthaner et al. patent, the completion of dialing is indicated by the operation of the DCL toggle (984) shown in FIG. 9, thereby providing a positive signal potential on lead DCL. This positive signal potential is applied through an inverter so as to place a negative signal potential on one input of each of the AND gates (1018). As set forth earlier, the line equipment location number 03-11-83 of calling line L13 is manifested by operated (FT–0), (FU–1), (FU–2), (VG–10), (VG–1), (HG–7), (HG–1) and (VF–3) relays of originating register 5. Therefore, those line identification leads, such as FU–, FT–, and VF– (typical) having negative battery potential thereon by virtue of operated make contacts of relays (FT–0), (FU–1), (FU–2), (VG–10), (VG–1), (HG–7), (HG–1), and (VF–3) are completed by operated make contacts of relay W to enable the associated AND gates (1018). The corresponding toggles (1019) are thus operated, thereby providing the proper signal potentials on the correspondingly designated line identification leads to lockout connector (1025).

The positive signal potential on lead DCL is also applied directly to the SRC lead to lockout connector (1025), so that a start signal is passed to repertory administrator (1030), FIG. 1, along with the line equipment location number signal voltages and the signal voltages for the AD code and directory number dialed by the calling subscriber in the manner set forth in detail in the Malthaner et al. disclosure.

When repertory administrator (1030) has entered the directory number into a memory storage location, identified by the line equipment location number and the repertory code, on repertory drum (30) as described in detail in the Malthaner et al. patent, a positive voltage is returned over the RCR reset lead, FIG. 9, to repertory change register trunk (22). This positive signal voltage is inverted and applied to the RSCR lead. In this manner the previously operated toggles (1019) are restored to normal. This negative potential present on the RSCR lead may advantageously be extended to enable flip-flop (93) in control circuit 8, thereby causing the operation of relay (RS) to indicate that repertory change register trunk (22) has completed the write function. Relay (RS) locks operated by an obvious locking path to ground through operated make contacts (RS–1), (S–3), and (ONC–7).

The closure of make contact (RS–2), FIG. 8, causes the insertion of tone source (60) across the T and R leads of the calling subscriber line L13. The tone source (60) may be arranged as well known in the art to return a momentary source of high tone distinguished from dial tone, to indicate that the write function has been completed. At this time the calling subscriber may abandon the call by replacing the receiver on the switchhook of telephone subset S1. The (ON) relay of originating register 5 releases as described in detail in the Busch patent, thus opening the operate path of relay (ONC), FIG. 2, in control circuit 8. The release of relay (ONC), along with the release of relay (ON), opens the holding path of all operated relays, thereby restoring all circuits to normal.

Change of Station S1 Memory Initiated by Station S2

A special service subscriber located at telephone subset S2, shown in FIG. 1, may from time to time desire to write entries into the memory storage location on repertory drum (30) assigned to telephone subset S1. The calling subscriber initiates a write substitution request by dialing the two-digit write function alerting code 98 followed by digits 03–11–83 of the line equipment location number assigned to line L13.

When the calling subscriber removes the receiver from the switchhook of telephone subset S2 marker and other common control circuits 6, as previously recited, operate relay (F), FIG. 3, of seized originating register 5. Referring now to FIG. 3 make contact (F–11) grounds the input to monopulser 34 in the aforementioned manner to reset the flip-flops of line equipment store 7 prior to recording the line equipment location number of calling line L23. As set forth in the Busch patent the operation of relay (F) operates relay (F1) to transfer the line equipment location number of line L23 from marker and other common control circuits 6, via originating register 5, to line equipment store 7. The line equipment location number 03–09–61 of calling line L23 is recorded by line equipment store 7 in the manner described hereinbefore by the subsequent operation of the (FT0), (FU1), (FU2), (VG2), (VG7), (HG2), (HG4), and (VF1) relays of originating register 5.

On a call originated from telephone subset S2 the assigned class of service indication 07 is automatically registered in class of service registration circuit 22 of originating register 5 as disclosed in the Busch patent. As shown in FIG. 2, make contact 5 of the operated class of service relays (CT0) and (CU7) provide an obvious path from ground to operate relay WC. Relay WC locks operated through make contact WC–1 and make contact (ONC–8) of the previously operated (ONC) relay. The operation of the WC relay serves as an indication to control circuit 8 that the calling subscriber is entitled to control the write function for another telephone subset. Accordingly, an input to AND gate 38, FIG. 3, is grounded through operated make contact WC–2 to partially prepare AND gate 38, as hereinafter described, to subsequently erase the line equipment location number of calling line L23 from line equipment store 7 and to substitute the dialed digits recorded in the digit registers or originating register 5 therefor.

When dial tone is returned from originating register 5 the calling subscriber dials the write function alerting code 98 followed by the digits 03–11–83 of the line equipment location number of line L13. As disclosed in the Busch patent the A through H digit registers, FIGS. 2 through 4, of originating register 5 consecutively records each of the dialed digits in the well-known two-out-of-five code format; therefore, for the first two dialed digits 98, relays (A2), (A7) and (B1), (B7) (not shown) will operate in digit registers 23 and 30, respectively. The resultant grounding of the CA2, CA7, CB1, and CB7 leads, in response to the dialed code 98, operates the correspondingly designated relays in the A and B digit auxiliary registers, shown in FIGS. 2 and 3, as set forth in the Kandel disclosure, of control circuit 8. In addition to operating the (CA2), (CA7), (CB1) and (CB7) relays of digit auxiliary relay registers 24 and 33 the grounding of leads CA2, CA7 and leads CB1, CB7 further prepares AND gate 38 of FIG. 3 for subsequent operation.

Since the calling subscriber has dialed the line equipment location number digits of line L13 in addition to the write function code 98, the (C4) and (C7) relays (not shown) of C digit register 41, FIG. 4, will operate to record the line frame tens digit 0. Thus, ground which was applied to the input of interdigital timer 47 during a write function call by telephone subset S2 through operated make contacts (CS–4), (CA7–1), (CA2–1), (CB1–1), (CB7–1), released break contact (W–1), via lead DC, a chain of released (CO–C7) relay break contacts and operated make contact (ON–15) is removed by the operation of break contacts (C4–6), (C7–6) and released make contact (CS–4) to inhibit the operation of relay (T) at this time.

Upon the recording of the last digit 3 of the dialed line equipment location number in H digit register 46 the operation of make contacts (H1–5) and (H2–5) supply ground provided by operated make contact (ON–17) to the inputs of OR gate 35, FIG. 3. Ground on an input of OR gate 35 enables OR gate 35 to operate D1 delay 39 to initiate a timing sequence to ensure that the complete dialed line equipment location number of line L13 has been recorded in the digit registers of originating register 5.

After D1 delay 39 has timed out, the correspondingly enabled output connected to the input of AND gate 38, along with the previously enabled inputs connected to leads CA2, CA7, CB1, CB7 and to make contact WC–2, turns on AND gate 38. The output from operated AND gate 38 turns on monopulser 31 for a period of time to enable OR gate 32 to clear the registers of line equipment store 7. Operation of OR gate 32 empowers the RES lead for the time period determined by monopulser 31 to reset the flip-flops of the set-reset storage elements of line equipment store 7 to release the corresponding relays. For example, referring to frames tens register 50 of FIG. 5 the enabled RES lead resets flip-flops FF5021, FF5022, FF5023, and FF5024 so that the corresponding relays (FT0), (FT1), (FT2), and FT3) are released. In a likewise manner the flip-flops of frames units register 51, vertical group 10 register 60; FIG. 6, vertical group register 61, horizontal group register 70; FIG. 7, and vertical file register 71 are released by the enabled RES lead to clear the line equipment location number of calling line L23 from line equipment store 7.

Operation of AND gate 38, FIG. 3, in addition to enabling monopulser 31 supplies an input to start D2 delay 36 to allow time for the aforementioned release of the line equipment location number relays. The time-out of D2 delay 36 enables lead LEQ to gate the dialed line equipment location number of line L13 from the digit registers of originating register 5 into the registers of line equipment store 7. Referring again to the frames tens register 50 of FIG. 5 the enabling of lead LEQ in turn enables one of the three inputs to each of AND gates 5001, 5002, 5003, and 5004. At this point the first digit 0 of the line equipment location number dialed into originating register 5 has been recorded in C digit register 41, FIG. 4, by the operation of the (C4) and (C7) relays (not shown) and the resultant grounding of leads CC4 and CC7. Thus, the enabled lead LEQ in combination with the grounded leads CC4 and CC7 operate AND gate 5001, FIG. 5, to enable OR gate 5011 to set flip-flop FF5021 to operate relay (FT0). Similarly relays (FU1) and FU2) are operated in frames units register 51 to record the second digit 3 of the dialed line equipment location number previously recorded in D digit register 42 of FIG. 4.

In the automatic telephone system disclosed by the Busch patent vertical groups 00 through 09 are recorded by the operation of two out of the five relays (VG0), (VG1), (VG2), (VG4), and (VG7). Another relay (VG10) is added in order that vertical groups 10 and 11 may be recorded by the operation of relay (VG10) in combination with relays (VG0) and (VG1), respectively. The present embodiment is furnished with vertical group 10 register 60, FIG. 6, to operate, when required, relay (VG10). In the absence of a digit 1 recorded in E digit register 43 of originating register 5 flip-flop 6021 remains in the reset position with relay (VG10) released. An output lead from flip-flop FF6021 enables AND gates 6402, 6405, 6408, and 6409 in order that two of relays (VG0), (VG1), (VG2), (VG4), and (VG7) may be operated by F digit register 44 grounding any two of the leads CF0, CF1, CF2, CF4, and CF7. The output lead of flip-flop FF6021 also enables inverter 6231 to inhibit AND gates 6401 and 6404 to prevent relays (VG0) and (VG1) from operating when relay (VG10) is released and leads CF4, CF7 and CF0, CF1 are grounded.

When the line equipment location number o3—11–83 for line L13 has been dialed into originating register 5 the dialed digits 11, representing vertical group 11, are consecutively registered in E and F digit registers 43 and 44; FIG. 4, thereby grounding leads CE0, CE1 and CF0, CF1. The grounded leads CE0 and CE1, in combination with enabled LEQ lead, operates AND gate 6001, FIG. 6, which in turn enables OR gate 6011 to set flip-flop FF6021 to operate relay (VG10). With flip-flop FF6021 in the set position inverter 6231 enables an input of AND gate 6404 in order that grounded leads CF0 and CF1 may enable AND gate 6404 to operate OR gate 6407 to subsequently operate relay (VG1). D4 delay 62, located in the LEQ lead input to vertical group register 61, inhibits the AND gates of the register to allow for the operation of flip-flop FF6021. Thus, the vertical group 11 location of line L13 is recorded by the operation of relays (VG10) and (VG1).

The remaining dialed digits of 8 and 3 are registered in the well-known two-out-of-five code in G digit register 45 and H digit register 46, FIG. 4, respectively. Grounding of the leads CG1 and CG7, FIG. 7, along with the enabled lead LEQ operate the appropriate AND gates of horizontal group register 70 to initiate a sequence to operate relays (HG1) and (HG7) to record the horizontal group location digit 8. In a likewise manner the vertical file digit 3 is recorded by vertical file register 71 when the grounded leads CH1 and CH2 initiate a sequence to operate relay (VF3). Thus, the line equipment location number 03–11–83 of line L13 is recorded by the operation of relays (FT0), (FU1), (FU2), (VG10), (VG1), (HG1), (HG7), and (VF3).

Referring now to FIG. 3, D2 delay 36, in addition to enabling lead LEQ, empowers the input to D3 delay 37 to start a timing sequence to ensure that the registers of line equipment store 7 have sufficient time to record the dialed line equipment location number. The subsequent time-out of D3 delay 37 results in the operation of relay D which in turn provides an obvious operate path through make contact D–1 for relay (T) of FIG. 4. As indicated hereinbefore the operated relay (T) completes a path through operated make contacts (T–1), FIG. 3, for the operation of relay (W) which locks operated through make contact (W–5), break contact (RS–1), and make contact (ONC–4) to ground.

In the aforementioned manner the operation of relay (W) opens (W–) break contacts, FIGS. 2 through 4, in leads ONRA through ONRH to remove the holding ground for the relays in the A through H digit registers. Also, as shown in FIG. 8, the operated relay W closes through the T, R, and S leads of line L23 to repertory change register trunk 22 at make contacts (W–9), (W–8), and (W–10) in order that the calling subscriber located at telephone subset S2 may, upon receipt of dial tone from dial tone generator (986), write entries into repertory change register trunk (22). Upon the completion of dialing the operation of DCL toggle (984), FIG. 9, initiates a sequence described in detail in the Malthaner et al. patent to enable AND gates (1018) to gate the line equipment location number of line L13, manifested by the operated (FT–), (FU–), (VG–), (HG–), and (VF–) relays, through operated contacts of relay (W) to repertory change register trunk (22) to operate the appropriate toggles (1019) so that the proper signals may be transmitted to lockout connector (1025). The DCL toggle (984), as hereinbefore described, also transmits an indication via lead SRC to lockout connector (1025), FIG. 1, so that a start signal, along with the dialed line equipment location number of line L13 and the write entries, are passed to the repertory administrator (1030). When the memory storage area corresponding to the dialed line equipment location number of line L13 has been located on repertory drum (30) the write entries made by the calling subscriber at telephone subset S2 are recorded in the storage location assigned for use by telephone subset S1.

In the aforementioned manner relay (RS), FIG. 9, is enabled to operate make contact (RS–2), FIG. 8, to place the high tone source (60) across the T and R leads to indicate the completion of the write function. The calling subscriber may release the connection by placing the receiver of telephone subset S2 on the switchhook to release originating register 5, the associated control circuit 8, and the line equipment store 7 in order that they may become available to serve other connections.

The calling subscriber may continue to hold the connection in which case the operated break contact (RS–1), FIG. 3, opens the operate path for slow release relay (W). As shown in FIG. 8, the release of relay (W) restores the continuity of the T and R leads of the calling subscriber's line to digit registration and control circuit 82 of originating register 5. The ONRA through ONRH leads to the A through H digit registers of FIGS. 2 through 4 in originating register 5 are grounded via released break contacts on relay (W). In addition, the DS lead to digit steering circuit 22 of FIG. 2 is grounded via released break contacts (W–14) shown on FIG. 4. Thus, originating register 5 may advantageously be recycled so that the calling subscriber may again dial a write function alerting code along with another telephone subset line equipment location number in order to write entries into the memory storage location assigned to the subscriber telephone subset.

SUMMARY

It is appreciated from the foregoing that the facility, economy, and efficiency of automatic telephone communication switching systems may be substantially enhanced by the provision of control and register apparatus arranged to permit a predetermined telephone subset to be utilized to write entries into a centralized memory storage location assigned to another telephone subset. It is further realized from the foregoing that the instant control and register apparatus unique feature of substituting a telephone subset's dialed line equipment location number for the automatically recorded line equipment location number of the calling telephone subset obviates the need to utilize a special service telephone subset to write entries into an assigned memory storage location.

We claim:

1. In a telephone system having lines, the combination comprising a memory store including a plurality of storage locations selectively connectable to each of said lines, means responsive to a service request signal from a calling one of said lines for coupling said calling line to one of said storage locations addressable by a line location number determined by said request signal, and means responsive to additional signals transmitted from said calling line for enabling said coupling means to couple said calling line to different ones of said storage locations independently of said determined line location number.

2. In a telephone system, the combination set forth in claim 1 further comprising means enabled by said request signal for automatically registering said determined line location number identifying said calling line, and wherein said enabling means comprises means enabled by said additional signals for deleting registration of said determined line location number in said registering means and for substituting therefore line location numbers defined by said additional signals.

3. In a telephone system, the combination set forth in claim 1 further comprising means for automatically identifying a class of service of said calling line.

4. In a telephone system, the combination set forth in claim 3 wherein said enabling means further comprises first register means selectively connectable to said calling line for registering line location numbers defined by said additional signals in predefined register locations.

5. In a telephone system, the combination set forth in claim 4 further comprising second register means for automatically recording said determined line location number of said calling line.

6. In a telephone system, the combination set forth in claim 5 wherein said enabling means further comprises logic means enabled by said identifying means in combination with said first register means for clearing said determined line location number from said second register and for subsequently gating said defined line location number from said first register means into said second register means.

7. In a telephone system, the combination set forth in claim 6 wherein said enabling means further comprises means enabled by said logic means for directing said coupling means to couple said calling line to one of said storage locations addressed by said defined line location number.

8. In a telephone system, the combination set forth in claim 7 wherein said directing means comprises apparatus for transmitting said defined line location number from said second register means to said memory store.

9. In a telephone system a central office, lines connected to said central office wherein each said line is designated by a line location number, a memory store common to said lines and responsive to signals from said lines for storing information in storage locations addressable by said line location numbers, means responsive to a service request signal from a calling one of said lines for automatically recording the designated line location number of said calling line, means selectively connectable to said calling line for registering code numbers and line location numbers defined by signals transmitted from said calling line, means operatively responsive to said registering means in accordance with said defined line location number and a predetermined one of said code numbers for canceling the designated line location number recorded in said recording means and for substituting said defined line location number therefore, and means operative upon the substitution of said defined line location number for coupling said calling line to the memory storage location defined by said substituted line location number.

10. In a telephone communication system a central office, lines connected to said central office wherein each said line is assigned a line location number and a class of service number the combination of which uniquely identifies said line, centralized memory storage equipment in said central office connectable to said lines for writing information signals transmitted from any said connected line into storage locations addressed by said line location numbers, first register means operatively responsive to a request signal from a calling one of said lines for recording the assigned line location number identifying said calling line, second register means selectively connectable to said calling line for recording additional signals defining line location numbers and code numbers dialed by said calling line, first relay means operatively responsive to said request signal for identifying the class of service number of said calling line, first logic means enabled by said first relay means in combination with the additional signals recorded in said second register means for detecting the recording of said code numbers and said line location number in said second register means, pulsing means enabled by said first logic means for canceling the assigned line location number recorded in said first register means, second logic means enabled by said first logic means for gating the dialed line location number recorded in said second register means into said first register means, second relay means enabled by said first logic means for ascertaining the completion of the registration of said dialed line location number in said first register means, third relay means enabled by said second relay means for connecting said calling line to said memory equipment, and means including make contacts of said third relay means for transferring said dialed line location number from said first register means to said memory equipment.

* * * * *